United States Patent

Hollaway et al.

[15] 3,676,859

[45] July 11, 1972

[54] DATA COMMUNICATION SYSTEM INCORPORATING DEVICE SELECTION CONTROL

[72] Inventors: John T. Hollaway, Austin, Tex.; Carl O. Pingry, III, Lexington, Ky.

[73] Assignee: International Business Machines Corporation, Armonk, N.Y.

[22] Filed: Dec. 23, 1970

[21] Appl. No.: 100,998

[52] U.S. Cl. ..........................................340/172.5, 178/17.5

[51] Int. Cl. ........................G06f 3/04, G06f 3/10, H04l 7/00

[58] Field of Search ...................340/172.5, 147, 150; 178/4, 178/4.1, 17, 17.5

[56] References Cited

UNITED STATES PATENTS

| | | | |
|---|---|---|---|
| 3,283,304 | 11/1966 | Sinn et al. | 340/152 |
| 3,296,370 | 1/1967 | Clark et al. | 178/17 |
| 3,314,051 | 4/1967 | Wilcox et al. | 340/172.5 |
| 3,348,209 | 10/1967 | Brooks | 340/172.5 |
| 3,403,225 | 9/1968 | Mislan et al. | 179/2 |
| 3,417,202 | 12/1968 | Kolpek | 178/17.5 X |
| 3,434,117 | 3/1969 | Gibson et al. | 340/172.5 |
| 3,453,387 | 7/1969 | Bagley | 178/17.5 |
| 3,465,302 | 9/1969 | Andrews et al. | 340/172.5 |
| 3,500,330 | 3/1970 | Hertz | 340/172.5 |
| 3,569,943 | 3/1971 | Mackie | 340/172.5 |

*Primary Examiner*—Paul J. Henon
*Assistant Examiner*—Jan E. Rhoads
*Attorney*—Hanifin and Jancin and John W. Girvin, Jr.

[57] ABSTRACT

A data communication system incorporating control means at the transmitting station for selecting which of several output devices at the receiving station will record the transmitted data. Selection of the output device governs the data rate of the transmitted information. Error control means at the receiving station operates to signal the transmitting station to select a predesignated output device for recording messages previously received in error on another output device. The error control means is responsive both to errors induced by the communication channel and recording errors induced by the output device.

6 Claims, 4 Drawing Figures

Patented July 11, 1972 3,676,859

4 Sheets-Sheet 1

INVENTORS
JOHN T. HOLLAWAY
CARL O. PINGRY, III

BY John W Girvin, Jr

ATTORNEY.

DATA COMMUNICATION SYSTEM INCORPORATING DEVICE SELECTION CONTROL

BRIEF BACKGROUND OF INVENTION

1. Field

This invention relates to a teletypewriter device and, more particularly, to a teletypewriter terminal having a secondary media output device which can be utilized separately or conjointly with the typewriter to record messages.

2. Description of the Prior Art

Prior art data terminals incorporating printers often have secondary media recorders such as paper tape punches or magnetic tape recorders associated therewith. Often, such a terminal is constructed to be responsive to special codes which actuate and deactuate the secondary media recorder. The special codes are generally transmitted in accordance with the type of record desired to be created and the information data rate remains unchanged. Similar systems also incorporate switches at the receiver which are operable by an operator to select output devices. The transmission speeds of such prior devices are generally fixed or limited by the slowest device (usually the printer) associated with the terminal.

Printer terminals incorporating a print buffer which is responsive to high speed transmission rates for short messages are generally known in the art. Data words are inputed into the buffer from the communication channel and are stored for subsequent slow speed printout. U.S. Pat. No. 3,465,302, assigned to the assignee of the present invention, describes such a system in which the receiving terminal also contains a manually actuable switch allowing the terminal to be connected to a low speed transmission line, the received data being routed directly to the printer instead of through a buffer storage which is utilized in conjunction with received information on a high speed line. Such a system allows operator selection of the data rate of the communication channel, the overall data rate of the system being governed in each instance by the speed of the output printer. Further, the transmitting station of such a system is capable of transmitting at only one rate (i.e. that of the selected line) since there is no feedback signal indicating the rate that the receiving station is receiving the data. None of the prior systems mentioned above transmit error information from the receiving station which is utilized by the transmitting station to select the output recording device to be utilized.

Prior art data terminals incorporating printers have utilized special codes to suppress printing when receiver errors are occurring, the codes being utilized to select alternate circuits to overcome the receiver errors. Such a terminal is described in expired U.S. Pat. No. 2,424,571. These devices are generally utilized in conjunction with remote unattended printers in order to keep them operable for a given data transmission. If the alternate circuits do not correct the error condition, it is generally necessary to terminate the transmission.

None of the prior art systems have means included therein which allow the transmitting station to select both the data rate and the data recorder utilized at the receiving station. Further, none of these devices allow for the selection of an alternate output device and/or output data rate as a result of errors which occur due to a faulty communication channel or due to output device malfunction.

SUMMARY

In order to overcome the above noted problems and shortcomings of the prior art, the data terminal of the present invention includes means responsive to a generated code signal originating at a transmitting station to select one of a plurality of output recording devices to be utilized for recording transmitted information. Additionally, output devices can be simultaneously selected. The data transmission rate is dependent upon the output device selected, the rate being consistent with the data rate of the slowest recorder selected.

Whenever a consistent system error occurs because of a malfunction in the communication channel or due to a malfunction of an output recorder, the lower data rate and the lower data rate receptive printer are caused to be utilized to record the message.

The foregoing and other features and advantages of the invention will be apparent from the following more particular description of the preferred embodiment of the invention as illustrated in the accompanying drawings.

Figure 1:
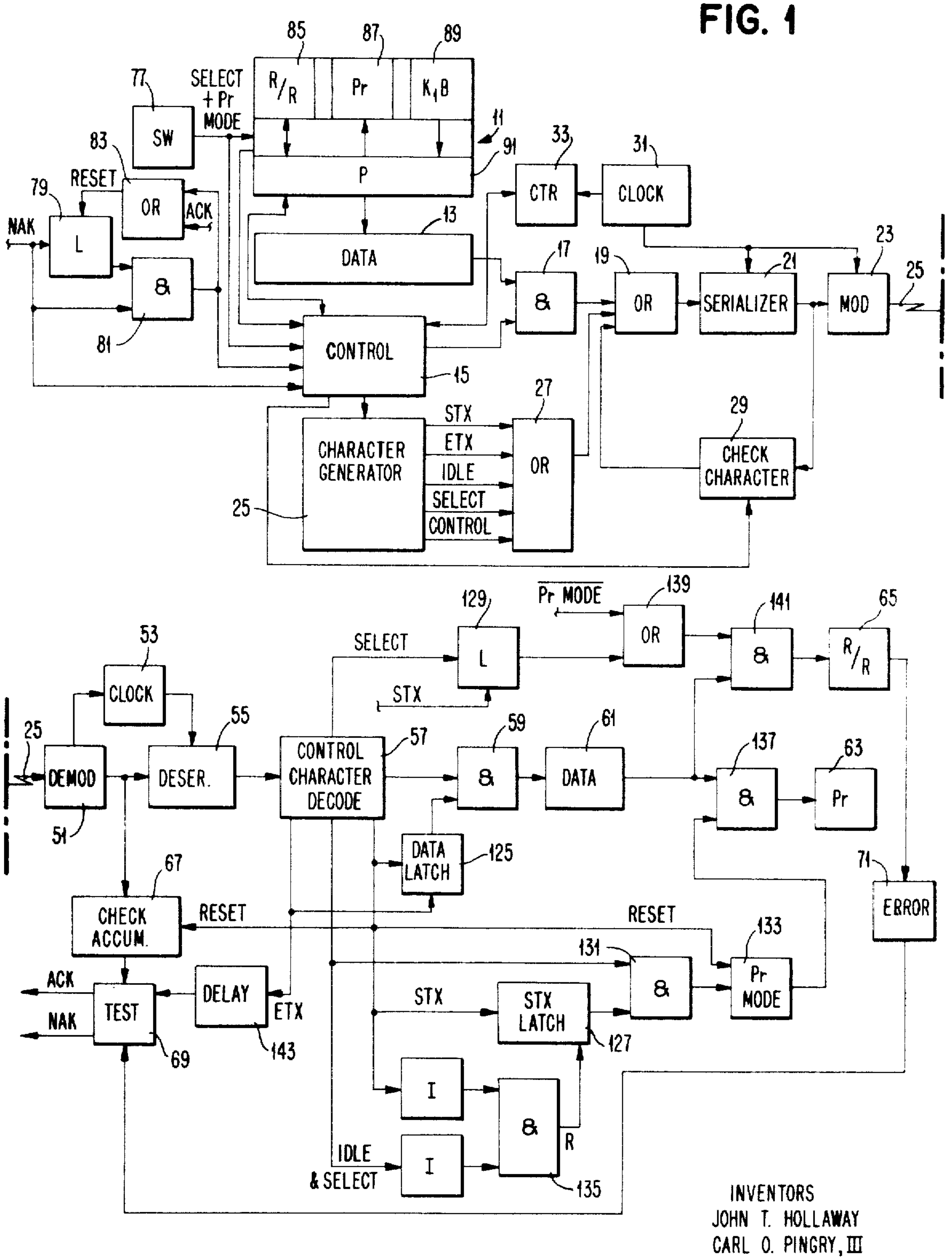
FIG. 1 is a schematic block diagram of the transmitting and receiving stations of a data communication system incorporating device selection control.

Referring now to FIG. 1 of the drawings, a schematic block diagram of the transmitting and receiving stations of the data communication system incorporating device selection control is depicted. The transmitting station comprises a data input device 11 which supplies data to the data register 13. The data information is gated from the data register under the control of control unit 15 through the And circuit 17, the Or circuit 19, the serializer 21, and the modulator 23 to the communication channel 25. The control unit 15 also effects the generation of special control codes by the character generator 25 which are gated through the Or circuit 27 to the Or circuit 19 then to the communication channel 25 in the same manner as data characters. The check character unit 29 is responsive to the output signal of the serializer 21 to generate a check character which is transmitted to the Or circuit 19 under the control of a gating signal supplied by the control unit 15 at the end of a data transmission. A system clock 31 drives the serializer 21, the modulator 23, (if required) the control unit 15 and an idle character counter 33.

Characters received at the receiving station from the communication channel 25 are demodulated by the demodulator 51 which may provide a timing signal to the system clock 53. The demodulated signal is deserialized by the deserializer 55 and decoded by the control character decode 57. Data characters are gated through the And circuit 59 to the data register 61. The character in the data register is then either printed on the printer 63, recorded on the magnetic media reader/recorder unit 65, or printed and recorded. A check accumulator register 67 is responsive to the demodulated signal to accumulate check characters. At the end of transmission, this register is tested by the test unit 69 to insure proper receipt of the information. The test unit 69 is also responsive to the error detect circuit 71 which detects errors of the reader/recorder. If no errors are detected, an acknowledge signal (ACK) is sent to the transmitting station. If an error is detected, a negative acknowledgement signal (NAK) is sent to the transmitting terminal.

The transmitting terminal is responsive to a series of negative acknowledgement signals and to the mode switch 77 to select which output device, the reader/recorder 65 or the printer 63 which will be utilized at the receiving station. Latch circuit 79 is set by a first negative acknowledgment signal and gates And circuit 81 which is responsive to a delayed output of the latch circuit 79 and to the second negative acknowledgement signal appearing on the line to provide an output signal to the control unit 15 causing the control unit to select the printer 63. The receipt of an acknowledgement signal or a signal from the And circuit 81 gates the Or circuit 83 reseting the latch circuit 79.

Each of the units described thus far with the exception of the control unit 15 which will be described hereinafter are conventional electric components. The data input device 11 can be a conventional terminal device having a secondary media reader/recorder. An example of such a device is the IBM Magnetic Card Selectric Typewriter currently marketed by the assignee of the present invention. This device consists of a magnetic card reader recorder unit 85, a typewriter printer 87, and a keyboard unit 89. Characters keyed on the keyboard 89 or sent from the reader recorder unit 85 are transmitted to a P register 91. A character located in the P register may be transferred to the printer 87 and to the reader recorder 85 if the character was keyboarded. Thus, there are two input devices, the keyboard unit and the card reader and two output devices, the card recorder and the printer. The selection of the units to be utilized for a data transmission is controlled by the operator.

Whenever the mode switch 77 is depressed causing the print mode to be selected at the receiving station, the printer 87 at the transmitting station is responsive to the characters located in the P register 91 to print a record of characters keyed on the keyboard 89 or read from the magnetic card reader/recorder 85. Whenever the mode switch 77 causes the reader recorder at the receiving station to be selected, characters keyed on the keyboard 89 or read from the reader recorder 85 of the transmitting station are routed to the P register and to the communication channel without causing characters to be printed on the printed 87. Whenever the mode switch 77 designates a select mode both the reader/recorder 65 and the printers 63 and 87 are designated to record information. Operator selection of a record mode or a playout mode on the IBM Magnetic Card Selectric Typewriter governs which input device is utilized. In playout mode, the card reader/recorder plays out previously recorded characters from the magnetic card medium to the P register. In record mode, the card reader/recorder records characters which are transferred to the P register from the keyboard. As indicated above, when the mode switch 77 selects only the reader recorder, the character inputted into the P register is not printed on the printer 87. Thus, the printer feedback signals may be ignored during this type of operation allowing a maximum keyboard rate which is governed only by reader/recorder speeds. As will be described hereinafter, the receiving station's printer and reader/recorder may also be an IBM Magnetic Card Selectric Typewriter, the data register 61 corresponding to the P register 91.

The control unit 15 is responsive to the data input device 11 to control data transmission. Once a communication channel is established between the transmitting station and the receiving station and once a data character is thereafter supplied by the data input device 11, the control unit 15 gates the character generator 25 causing a start of transmission code (STX) to be gated through the Or gate 27, the Or gate 19, and thereafter serialized by the serializer 21, modulated by the modulator 23 and transmitted over the communication channel 25 to the receiving unit. Thereafter, the control unit determines which mode has been selected by the mode switch 77. If neither the print mode nor the select mode have been designated, indicating that the receiving station's high speed reader recorder unit 65 is the output device designated for receipt of messages, the control unit 15 supplies a gating signal to the And circuit 17 gating the first data character from the data register 13 to the communication channel 25. If either the print mode or the select mode is designated by the mode switch 77 indicating respectively that the printer unit 63 or that both the printer unit 63 and the reader recorder unit 65 are designated as the output device for the receiving station, the control unit 15 provides a signal to the character generator 25 causing it to transmit an idle code or a select code in accordance with the mode selected. That is, if the print mode is selected, an idle code is generated and gated through the Or circuit 27 to the communication channel 25. If the select mode is selected, a select code is gated in the same manner to the communication channel 25. Thereafter, the control unit 15 gates the first data character from the data register 13 by supplying a gating signal to the And circuit 17 which thus gates the data character to the communication channel 25. The control unit is thereafter responsive to the counter 33 to effect the gating of four idle codes from the character generator to the communication channel 25.

The counter 33 has five unique states associated therewith. After the first data character has been transmitted, the counter is initiated and is responsive to the system clock 31 to thereafter advance through four time intervals corresponding to the time intervals of a data character transmission. As the counter advances through each such state, it supplies a signal to the control unit 15 which in turn effects the generation of an idle code through the character generator 25. When the counter reaches its fifth state, the control unit 15 supplies a gating signal to the And circuit 17 to gate out the next data character. Thereafter, four idle codes are transmitted followed by the next subsequent data character and so on until the last data character is transmitted.

The last data character of a record which is to be transmitted is designated when the printer 87 effects a carriage return or when the card reader/recorder advances to a different data track. When this condition is sensed, a signal is sent to the control unit 15 which thereafter effects the generation of an end of transmission code (ETX) and check character codes. The check character codes are derived from the information contained in the check character unit 29 which is gated through the Or circuit 19 under control of a gating signal supplied by the control unit 15. Summarizing, when the reader recorder unit 65 at the receiving station is selected, the control unit 15 effects the transmission of a data message without placing idle codes in the data stream. When the printer 63 is designated as a receiving recorder at the receiving station, idle codes are placed in the data stream thereby slowing down the data rate to the slower output speed of the printer 63.

Figure 2:
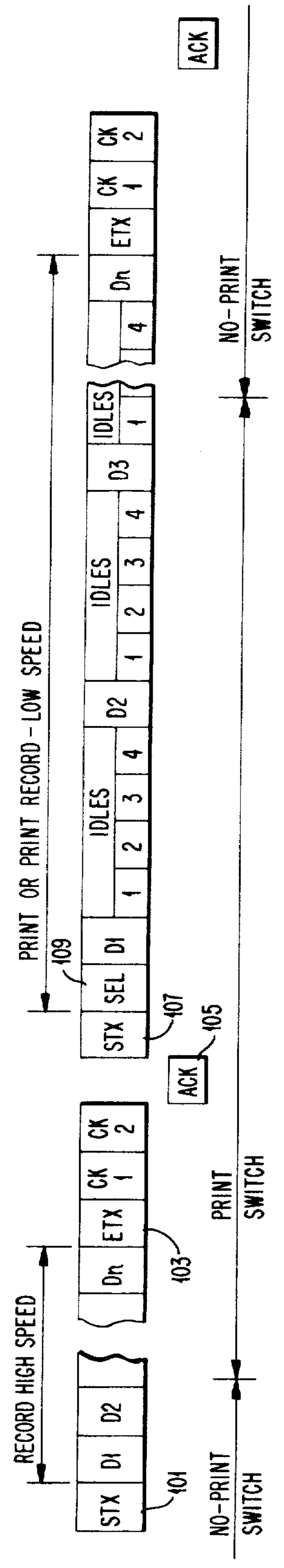
FIG. 2 is a timing diagram depicting information transmitted in accordance with device selection.

Referring now to FIG. 2 of the drawings, a timing diagram depicts the time sequence of information transmitted in accordance with output device selection. That is, when the printer is not selected, the data transmitted consists of a start code (STX) 101 followed by successive data codes (D1 - Dn) followed by an end of transmission code (ETX) 103 followed by check characters (CK1 and CK2). Then an acknowledgement signal 105 is transmitted by the receiving station indicating correct receipt of the information. If the print mode is selected during a high speed data transmission, the next record transmitted will be at the lower data rate. Thus, a start of transmission code 107 followed by a select code or an idle code 109 is transmitted indicating respectively that both the printer and reader recorder unit or just the printer alone is designated as the output recorder. Thereafter, follows the first data character (D1) in turn followed by four idle codes. The second data character is then transmitted which is followed by four idle codes and so on until the last data character is transmitted followed by an end of transmission code and two check codes.

Referring once again to FIG. 1 of the drawings, the logic at the receiving station is responsive to the code following the start of transmission code to determine which unit will be selected to record the message. If the reader recorder unit 65 alone is to be utilized, the first character following the start of transmission character is a data character. If both the reader recorder and the printer unit 63 are selected, the first character is a select character. If only the printer 63 is to be selected, the first character following the start of transmission code is an idle character.

The received signal is transmitted from the communication channel 25 through the deserializer 55 to the control character decode 57. The first character which is recognized must be a start of transmission code. This code is utilized to set the data latch 125 which controls the gating of data characters and is also utilized to set the STX latch 127. The next code received is decoded to determine output unit selection. If the next character is a select character, the latch 129 is set. If the next character received is a select code or an idle code, an output signal is provided to the And gate 131. This signal gates the output signal of the STX latch 127 to set the print mode latch 133. If the second character is received is neither an idle code or select code, and is not an STX code, the And circuit 135 provides a reset signal to the STX latch 127. Thus, the print mode latch 133 is not capable of being thereafter set with an idle code. Accordingly, the print mode latch 133 is set only when the second character is a select code or an idle code subsequent idle codes within the message having no effect thereon.

All data characters are transmitted from the control character decode through the And gate 59 to the data register 61. The character in the data register is thereafter gated to the printer 63 through the And circuit 137 if the print mode latch 133 is set. If the print mode latch is not set, the Or circuit 139 provides an output signal which gates the character in the data register through the And circuit 141 to the reader recorder unit 65. Additionally, if a select code was detected setting the latch 129, the Or circuit 139 provides an output signal gating the characters in the data register 61 to the reader recorder unit 65. Thus, both the printer 63 and the reader recorder 65 are responsive to the character in the data register when the select mode is designated. Idle codes transmitted intermediate character codes are detected by the control character decode 57 which prevent them from being gated to the data register 61. Both the print mode latch 133 and the latch 129 are reset with the start of transmission code of the next subsequent message. The end of transmission code (ETX) is detected by the control character decode 57 and routed through a delay unit 143. The delayed ETX code thereafter supplies a gating signal to the test unit 69 which tests the contents of the check accumulate register 67. The check accumulate register 67 is reset to a zero condition upon receipt of the check characters following the ETX code. If the check accumulate register does not reset to zero on receipt of these characters, an error is indicated and the test unit 69 provides a negative acknowledgement response signal to the transmitting unit. If the check accumulate register indicates a no-error condition, a positive acknowledgement signal is transmitted provided that the error detect circuit 71 does not indicate that a reader recorder error has taken place. If such a reader recorder error has taken place indicating a recording error, a negative acknowledgement signal is transmitted.

The above description has related to the various functions and operations of the units depicted in FIG. 1 of the drawings. In the description which follows, the sequential operation of the control unit 15 will be described, it being understood that this unit consists of conventional gating circuits which are responsive to the clock 31 and the various switches and logical units depicted in FIG. 1.

Figure 3:
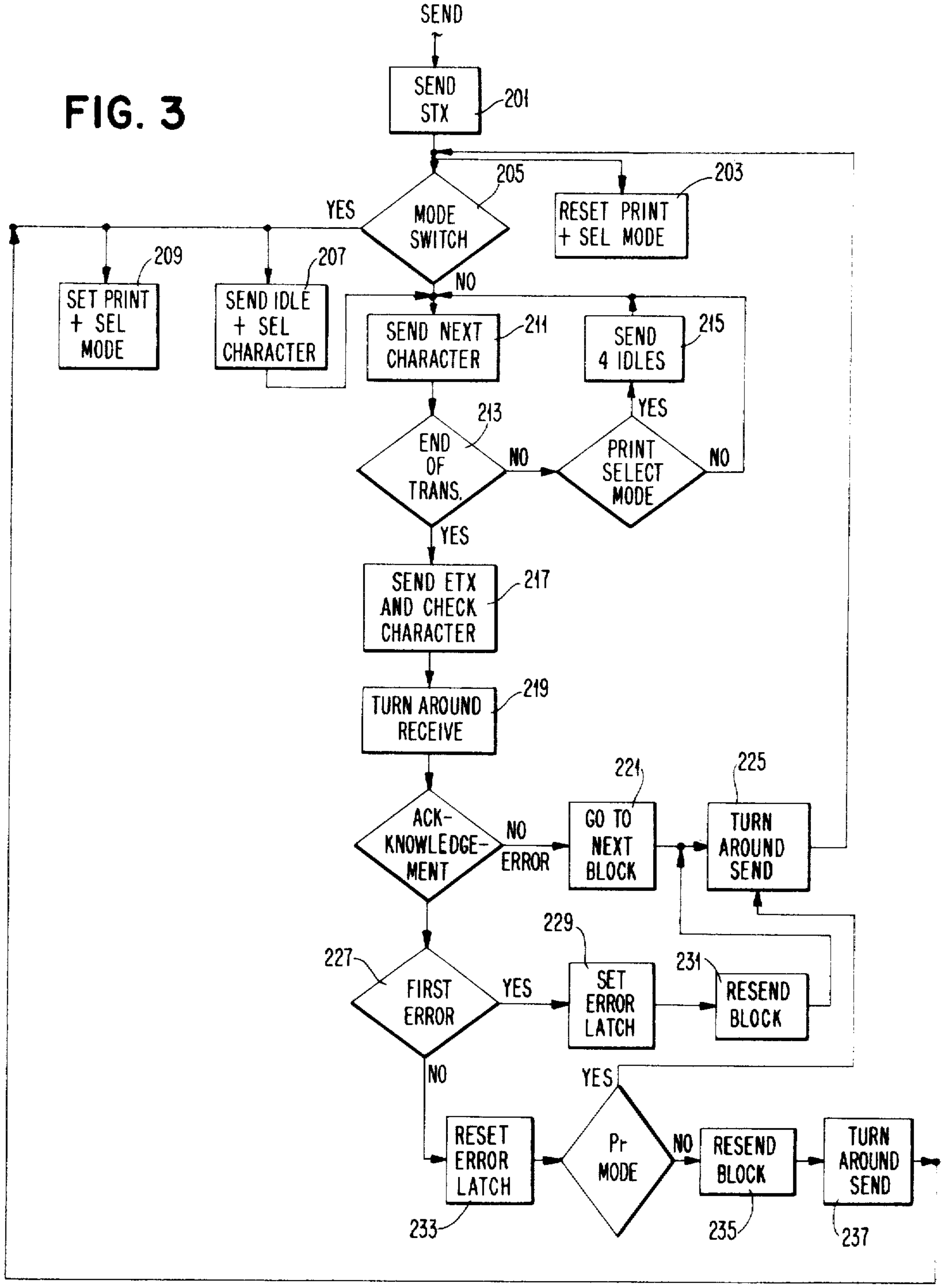
FIG. 3 is a block flow diagram depicting the operation of the transmitting station of FIG. 1.

Referring now to FIG. 3 of the drawings, a block flow diagram is depicted that shows the operation of the control unit of the transmitting station of FIG. 1. A start of transmission code is sent as denoted by block 201 before the first data character is sent. Thereafter, the print mode and select mode is reset as denoted by block 203 and the mode switch is sampled as denoted by block 205. If the select mode or print mode is indicated, an idle or select character is transmitted in accordance with the mode selected as denoted by block 207 and a mode indicator is set as denoted by block 209. Thereafter, the next data character is transmitted as denoted by block 211 and a check is made to determine whether an end of transmission is required as denoted by block 213. Assuming an end of transmission is not required, a test is made to determine whether the print or select mode has been designated. If the print or select mode has not been designated, the next data character is thereafter transmitted as indicated by block 211. If the print or select mode has been designated, four idle codes are transmitted as indicated by block 215 prior to the transmission of the next data character. Once an end of transmission condition exists, the end of transmission character and check character is transmitted as denoted by block 217 and the system awaits a positive or negative acknowledgement signal as indicated by block 219. If the acknowledgement indicates no error, appropriate commands are generated to reset the error latch, to send the next track of data information from the card reader or the next line unit of information from the keyboard as denoted by block 221 and the necessary switching is effected to place the transmitter again in a transmit mode by sending an STX code as denoted by block 225. Thereafter, the next record is sent in a similar manner.

If an error is detected and a negative acknowledgement is received, a check is made to determine whether it is a first error as denoted by block 227 and if it is the first error, the error latch is set as denoted by block 229 and the necessary logic is actuated as denoted by block 231 to effect the retransmission of the same record. This logic is in the reader recorder unit and keeps the reader recorder head from stepping up to the next track so that the same information is sent from the reader recorder unit as was previously sent or the information just recorded on the unit from the keyboard is sent. If the error is not the error, the first error latch is reset as indicated by block 233. Thereafter, the print mode switch is sampled to determine whether the system was previously in a print mode. If the system was previously in a print mode, the error is ignored and the next record is transmitted. If the system was not in a print mode, it is again necessary to resend the block of information including the STX code as denoted by blocks 235 and 237. However, the print mode is then selected so that the error message can be printed out at the slower data rate on the printer.

Figure 4:
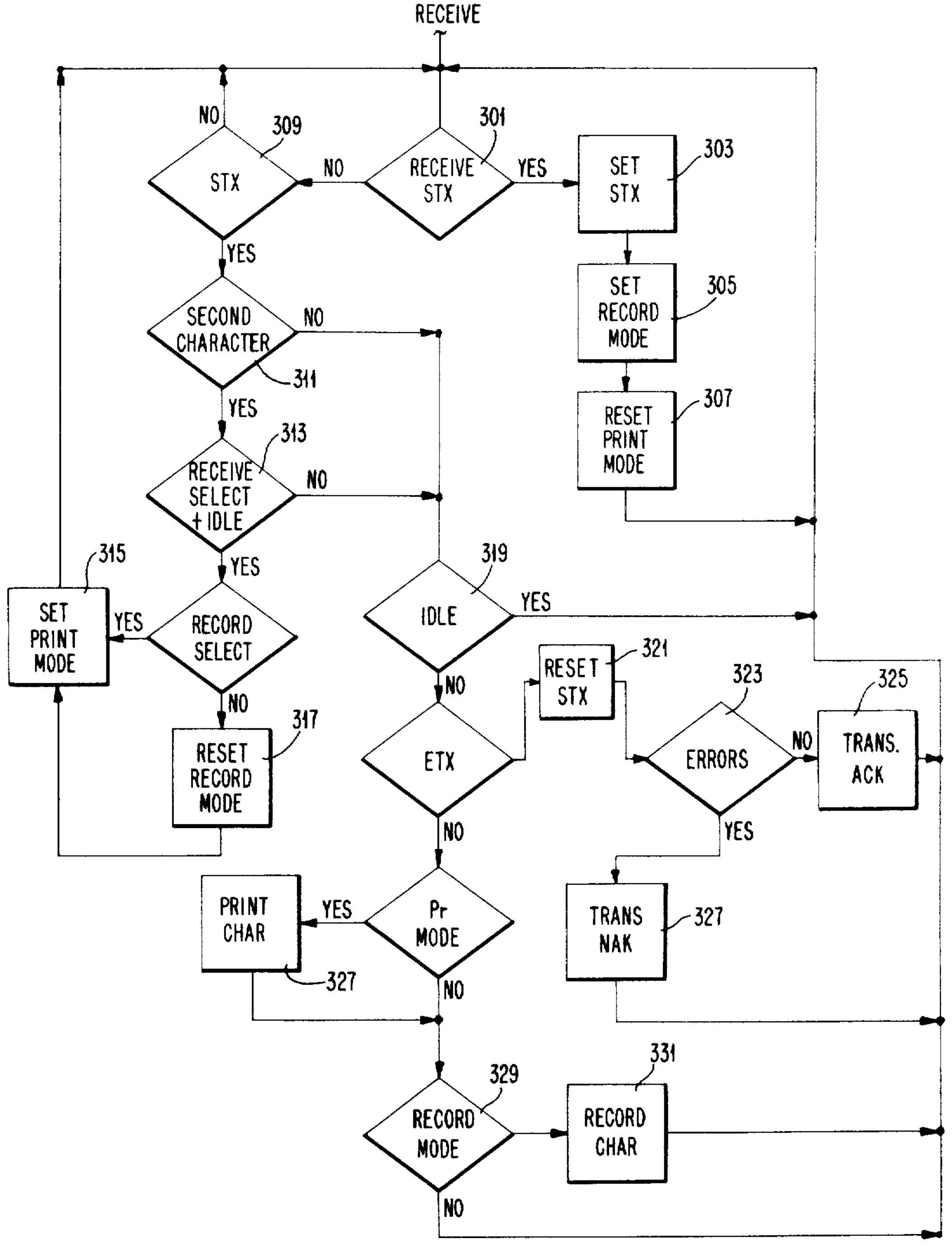
FIG. 4 is a block flow diagram depicting the operation of the receiving station of FIG. 1.

Referring now to FIG. 4 of the drawings, a block flow diagram depicting the operation of the receiving station of FIG. 1 is depicted. Each received character is checked as noted by block 301 to determine if it is a start of transmission code. If it is a start of transmission code, a start of transmission latch 303 corresponding to the data latch 125 of FIG. 1 is set, a record mode latch 305 is set and the print mode latch 307 is reset. If a character received is not a start of transmission code, a check is made as noted by block 309 to determine whether the STX latch has been set. If the STX latch has not been set, the next character is awaited. If the STX latch has been set indicating a message is being received, a check is made to see whether this is the second character of a transmission. If it is the second character of a transmission as denoted by block 311, a check is made as denoted by block 313 to determine whether a select code or idle code is received. If such a code is received, it is checked to see whether it is a code which selects both the recorder and printer. If both the recorder and printer are selected the print mode latch is set as denoted by block 315, the record mode latch having previously been set as denoted by block 305. If the record mode is not selected along with the printer, the record mode latch is reset as denoted by block 317 and the print mode latch is thereafter set as denoted by block 315.

If the second character received is not a select or idle code or if a subsequent data character is being received, a determination is made as to whether the code received is an idle code as denoted by block 319. If an idle code is received, the system awaits the receipt of the next character. If an idle code is not received, a check is made to see whether it is an end of transmission code in which event the STX latch is reset as indicated by block 321 and a check is made as denoted by block 323 to determine whether errors are present. If no errors are present, an acknowledgement signal is transmitted as denoted by block 325 and if errors are present, a negative acknowledgement signal is transmitted as denoted by block 327. Thereafter, the system awaits receipt of further information. If an end of transmission code is not received, a check is made of the print mode latch which is set, causes the character to be printed as denoted by block 327. Thereafter, the record mode latch is tested as denoted by block 329 and if set, causes a character to be recorded as denoted by block 331 on the card reader recorder. Thereafter, the system awaits a further character.

OPERATION

Referring once again to FIG. 1 of the drawings, when it is desirous to transmit a message from the data input device 11 to the communication channel 25 at the maximum data rate of the system, the mode switch 77 is actuated so that neither the print mode nor the select mode will be specified. Thereafter, characters keyed on the keyboard 89 or read from the magnetic card reader recorder unit 85 are transmitted to the P register 91. The character in the P register 91 is transferred to the data register 13 from whence it is gated by control signals supplied by the control unit 15 through the And circuit 17, the Or circuit 19 the serializer 21 and the modulator 23 to communication channel 25. The characters located in the P register 91 are not transferred to the printer 87 so that the maximum data rate is maintained at the transmitting station. Assuming a synchronous system, it is necessary to supply control codes between characters keyboarded at slow rates. The character generator operating in conjunction with the control unit 11 is also utilized to provide control codes. If an asynchronous system is utilized, this is unnecessary. The card reader recorder unit 85 is operated at the maximum data rate so that control characters are not required for a synchronous system.

If it is desired to transmit characters at a slower data rate to achieve a printed record either at the transmitting station or at the receiving station, the mode switch 77 is actuated to select a print mode only or a print and record mode. Characters are supplied to the P register 91 in the same manner as described above. However, the characters located in the P register 91 are printed on the printer 87 as well as being transferred to the data register 13. The control unit 15 is responsive to the mode switch 77 and the counter 33 to supply a number of idle characters between data characters thereby slowing the data rate to a rate which can be handled by the printer 87 and by the printer 63 at the receiving station. Additionally, the control unit 15 sends a special code immediately following the start of transmission code signifying that the printer at the receiving station is to be selected. If an asynchronous system is utilized, it is necessary only to delay transmission of a data character by a time interval corresponding to that occupied by data codes. That is, the data character is gated out of the serializer during the first 15 m. s. of a character cycle as controlled by a clock. The clock continues to count out 67.5 m. s. before the next character can be sent. Thus, the data rate of the input device is restricted to 14.8 characters per second.

When the special character following the start of transmission code is decoded by the control character decode 57 at the receiving station, the print mode latch 133 is set thereby causing all subsequent data characters received by the data registers 61 to be gated through the And circuit 137 to actuate the printer 63. If a select mode is specified designating both the printer and the reader recorder as output devices, the latch 129 as well as the print mode latch 133 is set thereby providing a gating signal through the And circuit 141 to cause the information in the data register 61 to be recorded on the magnetic card recorder unit 65. If the print mode is not selected, the reader recorder is again responsive to the information in the data register to record the transmitted information.

The error detect circuit 71 detects recording errors on the magnetic card reader recorder unit 65 and supplies a signal indicating a recording error to the test unit 69. The recording of data characters and the checking thereof on a magnetic card reader/recorder is described in U.S. Pat. No. 3,530,448 assigned to the assignee of this invention. Additionally, the received character record is checked to insure that there has been no errors induced by the communication channel. If such an error is detected, the test unit 69 is again supplied with a signal indicating the receipt of an error. Detection of an error causes a negative acknowledgement signal to be sent back to the transmitting station setting the latch circuit 79. Assuming that it is the first negative acknowledgement signal received, the control unit 15 effects the retransmission of the same data message. This is done by causing the magnetic card reader recorder unit to re-read the track of information previously transmitted. If the negative acknowledgement signal is the second such signal received, a signal is provided by the And circuit 81 which causes the control unit 15 to select a print mode operation and to thereafter retransmit the error message. The message which was thus received twice in error is retransmitted to the printer 63 thus insuring that the operator can visually check and determine the extent of the error. The control unit 15 then causes the next record to be transmitted to the output unit determined by the position of the mode switch 77.

Various idle codes have been described as being generated to insure a lower data rate. As is understood by those skilled in the art, it is not necessary to generate discrete codes when utilizing an asynchronous communication channel, it only being necessary to insure no transmission during a specified time interval. Additionally, alternate device selection has been described as occurring after a second error has occurred. Of course, any error limit can be utilized with the present system.

The above description has also related to a terminal to terminal communication system utilizing two identical terminals each terminal having a serial character printer and a serial character reader/recorder unit. It is understood by those skilled in the art that various terminal configurations can be utilized including a computer to remote station communication system without departing from the present invention. Additionally, various recording units such as paper tape punches, magnetic tape recorders and combinations thereof could also be utilized. Further, the above description relates to terminals having two output recorders, it being understood that more than two recorders each having varying data rates could be utilized by supplying the proper idle time intermediate data character transmission and a select code for the selected device.

While the invention has been particularly shown and described with reference to a preferred embodiment thereof, it should be understood by those skilled in the art that the foregoing and other changes in form and detail may be made therein without departing from the scope of the invention.

What is claimed is:

1. A data communication system comprising:

a communication channel;

a transmitting station including; a data character input device for providing a sequence of data character signals, idle generating means for providing delay signals, mode selection means for selecting one of at least two output device modes, and for providing an output selection signal indicative of the selected mode to the communication channel, and control means, responsive to the mode selection means, for gating successive data character signals from said input device to said communication channel when a first mode is selected, and for gating data character signals and delay signals alternately to said communication channel when a different mode other than said first mode is selected;

a receiving station including: an actuable first output device, responsive to the data character signals of the communication channel, for recording data characters at a relatively low recording rate, an actuable second output device, responsive to the data character signals of the communication channel for recording data characters at a relatively high recording rate, and gating means, responsive to the output selection signal of the communication channel, for actuating said second output device when said first mode is selected, and for actuating said first output device only when said different mode is selected.

2. The data communication system set forth in claim 1 further comprising:

a third selectively actuable output device, located at said transmitting station and responsive to said data character input device, for recording data characters at a relatively low recording rate;

actuating means, responsive to the mode selection means, for actuating said third output device when said different mode is selected.

3. The data communication system set forth in claim 1 wherein:

said mode selection means includes means for selecting a third dual output device mode and for providing a dual output mode signal to the communication channel;

and wherein said gating means includes means responsive to the dual output mode signal, for actuating said first and said second output devices.

4. The data communication system set forth in claim 1 further comprising:

error detection means at the receiving station for detecting errors in the received data characters, and for providing an error signal to the communication channel indicative of the detected errors; and wherein said mode selection means includes means, responsive to a predetermined number of error signals of the communication channel, for selecting said different mode if said first mode has been selected.

5. The data communication system set forth in claim 4 wherein:

said first output device is an image printer and said second output device is a secondary medium recorder.

6. The data communication system set forth in claim 5 wherein said error detection means includes means, further responsive to errors in recording indicated by said secondary medium recorder, for providing said error signal.

* * * * *